US009430520B2

United States Patent
Dove et al.

(10) Patent No.: US 9,430,520 B2
(45) Date of Patent: *Aug. 30, 2016

(54) SEMANTIC REFLECTION STORAGE AND AUTOMATIC RECONCILIATION OF HIERARCHICAL MESSAGES

(71) Applicant: Microsoft Corporation, Redmond, WA (US)

(72) Inventors: Bryan Dove, Seattle, WA (US); Eugene Lee, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/270,261

(22) Filed: May 5, 2014

(65) Prior Publication Data

US 2014/0244671 A1    Aug. 28, 2014

Related U.S. Application Data

(63) Continuation of application No. 13/206,459, filed on Aug. 9, 2011, now Pat. No. 8,756,242.

(60) Provisional application No. 61/497,578, filed on Jun. 16, 2011.

(51) Int. Cl.
*G06F 17/30* (2006.01)

(52) U.S. Cl.
CPC ... *G06F 17/30386* (2013.01); *G06F 17/30489* (2013.01); *G06F 17/30731* (2013.01)

(58) Field of Classification Search
CPC .................................................. G06F 17/30386
See application file for complete search history.

(56) References Cited

U.S. PATENT DOCUMENTS 7,512,633 B2 *   3/2009   Cohen ............... G06F 17/30917
8,688,476 B2 *   4/2014   Cinqualbre ............ G06Q 50/22
                                                              705/2

\* cited by examiner

*Primary Examiner* — Apu Mofiz
*Assistant Examiner* — Cindy Nguyen
(74) *Attorney, Agent, or Firm* — Jessica Meyers; Jim Ross; Micky Minhas

(57) ABSTRACT

Database storage of hierarchically structured messages is facilitated based on structural semantic reflection of the message and automatic reconciliation of the messages. The structural semantics of an incoming message may be assessed and database storage provisioned based on the structural semantic reflection of the message. The system may auto-adapt over time as incoming messages from a known source change and automatically generate code which applies the sequential logic to a stream of messages in order to represent the latest state for a given context. Furthermore, the hierarchical semantics of messaging formats may be applied to a flexible set of database structures that represent the raw contents of the messages.

20 Claims, 9 Drawing Sheets

SEMANTIC REFLECTION STORAGE AND AUTOMATIC RECONCILIATION OF HIERARCHICAL MESSAGES

CROSS-REFERENCE TO RELATED APPLICATIONS

This application is a continuation under 35 U.S.C. §120 of U.S. patent application Ser. No. 13/206,459 filed on Aug. 9, 2011 and patented as U.S. Pat. No. 8,756,242 on Jun. 17, 2014, which claims priority under 35 U.S.C. §119(e) to U.S. Provisional Patent Application Ser. No. 61/497,578 filed on Jun. 16, 2011. The disclosures of the U.S. Patent and the U.S. Provisional Patent Application are hereby incorporated by reference in their entireties.

BACKGROUND

In today's networked and computerized communication environments, a number of different systems interact for performing related tasks. Typically, multiple levels of protocols are used to ensure correct and efficient exchange of information between different systems. For example, there are a number of messaging standards that enable exchange of information within specific industry segments. For example, HL7 (Health Level Seven) is a messaging standard commonly used in healthcare systems, EDI is a standard used in financial systems for exchanging information between different applications. These standards define a format for the transmission of health or finance related information. In these and similar standards, information is sent as a collection of one or more messages, each of which transmits a record or item. Examples of HL7 messages include patient records, laboratory records and billing information.

Message standards, such as HL7 in healthcare and EDI in financial systems, are naturally hierarchical and sequential in nature. That is to say that the message format is designed to be expressed as a hierarchical structure, not as a set of database rows. Further compounding this challenge in storing the messages in a database, is that messages often need to be merged along the same contextual axis in the sequence they were created to reflect the true status of the subject of the message.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to database storage of hierarchically structured messages based on structural semantic reflection of the message and automatic reconciliation of the messages. According to some embodiments, the structural semantics of an incoming message may be assessed and database storage provisioned based on the structural semantic reflection of the message. A system according to embodiments may auto-adapt over time as incoming messages from a known source change and automatically generate code which applies the sequential logic to a stream of messages in order to represent the latest state for a given context. Furthermore, the hierarchical semantics of messaging formats may be applied to a flexible set of database structures that represent the raw contents of the messages.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
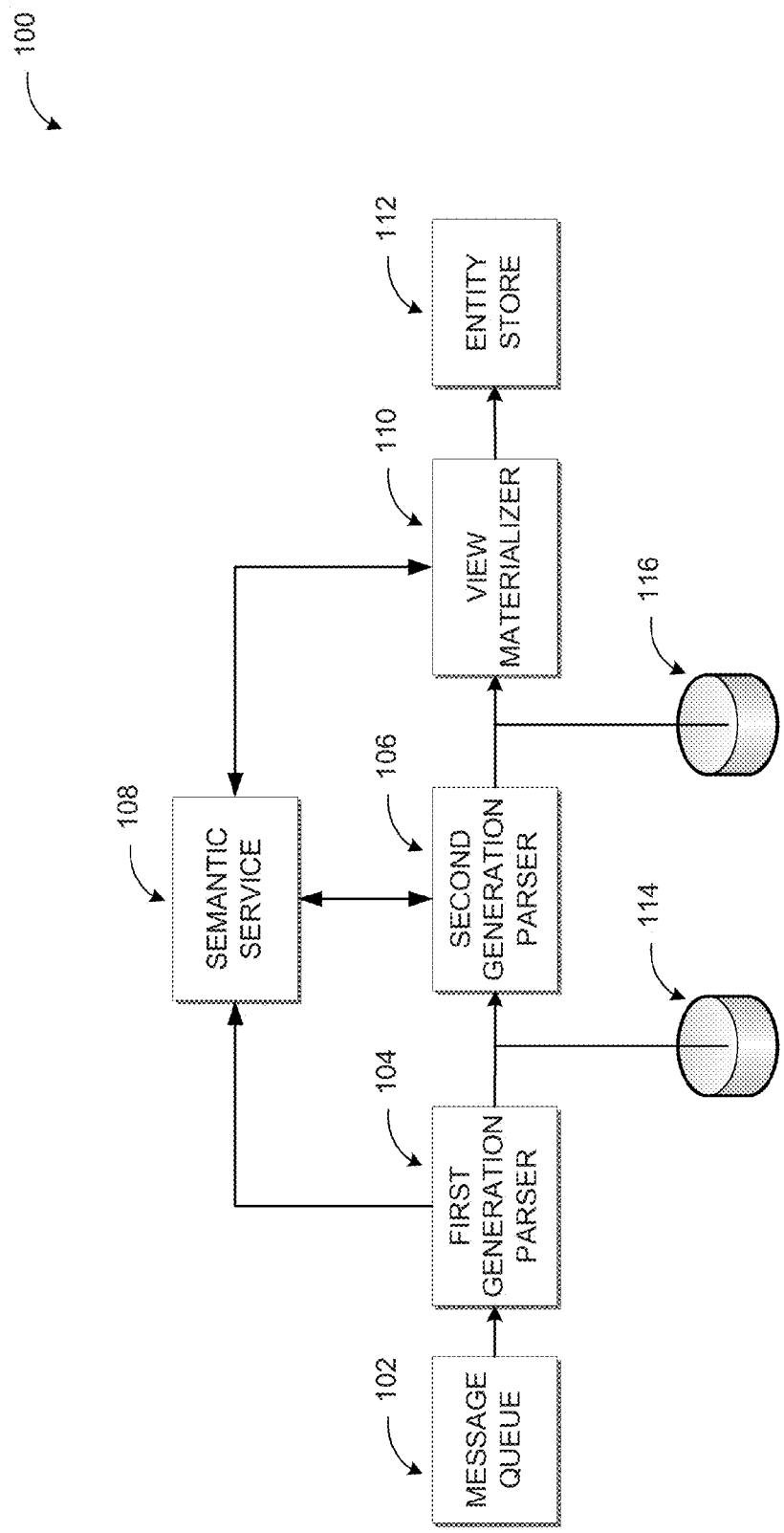
FIG. 1 illustrates an example pipeline of logical processing steps for processing messages.

As briefly described above, database storage of hierarchically structured messages may be accomplished based on structural semantic reflection of the message and automatic reconciliation of the messages. The structural semantics of an incoming message may be assessed and database storage provisioned based on the structural semantic reflection of the message. Auto-adaptation over time may be performed as incoming messages from a known source change and code, which applies the sequential logic to a stream of messages may be automatically generated in order to represent the latest state for a given context. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or compute readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for facilitating message processing. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network.

FIG. 1 illustrates an example pipeline of logical processing steps for processing messages. In a system according to embodiments, received messages are shredded based on their structure first, not their content. The shredding component places the structural components into a data store in insert-only form. In a subsequent auto-adaptation process, the database schema may be altered as new structures (e.g., new fields) are encountered. An overflow column may be used for items not encountered previously.

The auto-adaptation is additive, does not remove items, just adds new columns, etc. The feature may be turned on or off in restrictive environments. If a feed sends incomplete data (e.g., missing fields), the system may take the last message received and apply transforms at least partially based on the last message. The transforms may be default or customized.

As shown in diagram 100, a starting point of the pipeline is the message queue 102, where the raw ingested messages may be stored. The end point of the pipeline is entity store 112, where entities are stored. The entities may be bound to ingested data through database query statements such as SQL statements in some embodiments. In some cases, the SQL statements may directly query a physical table whereas in other cases, they may be views. The data ingestion pipeline starts from the message queue and transforms data in a state such that entities can be bound to them. The data ingestion pipeline may be viewed in three logical processing steps: the first generation parser 104, second generation parser 106, and view materializer 110.

First generation parser 104 may shred messages based on their structure and store the structural components in first generation store 114. Second generation parser 160 may perform transforms based on content and/or structure (derivations) and store the results in second generation store 116. The data in the second generation store 116 may include derived columns that stored derived data. In generating derived columns, semantic labels may be used to indicate where to take the data from. This may be any column that has been encountered up to the segment being processed. Semantic service 108 may receive information for generating semantic labels from first generation parser 104 and interact with second generation parser 106 and view materializer 110 in processing the data.

Figure 2:
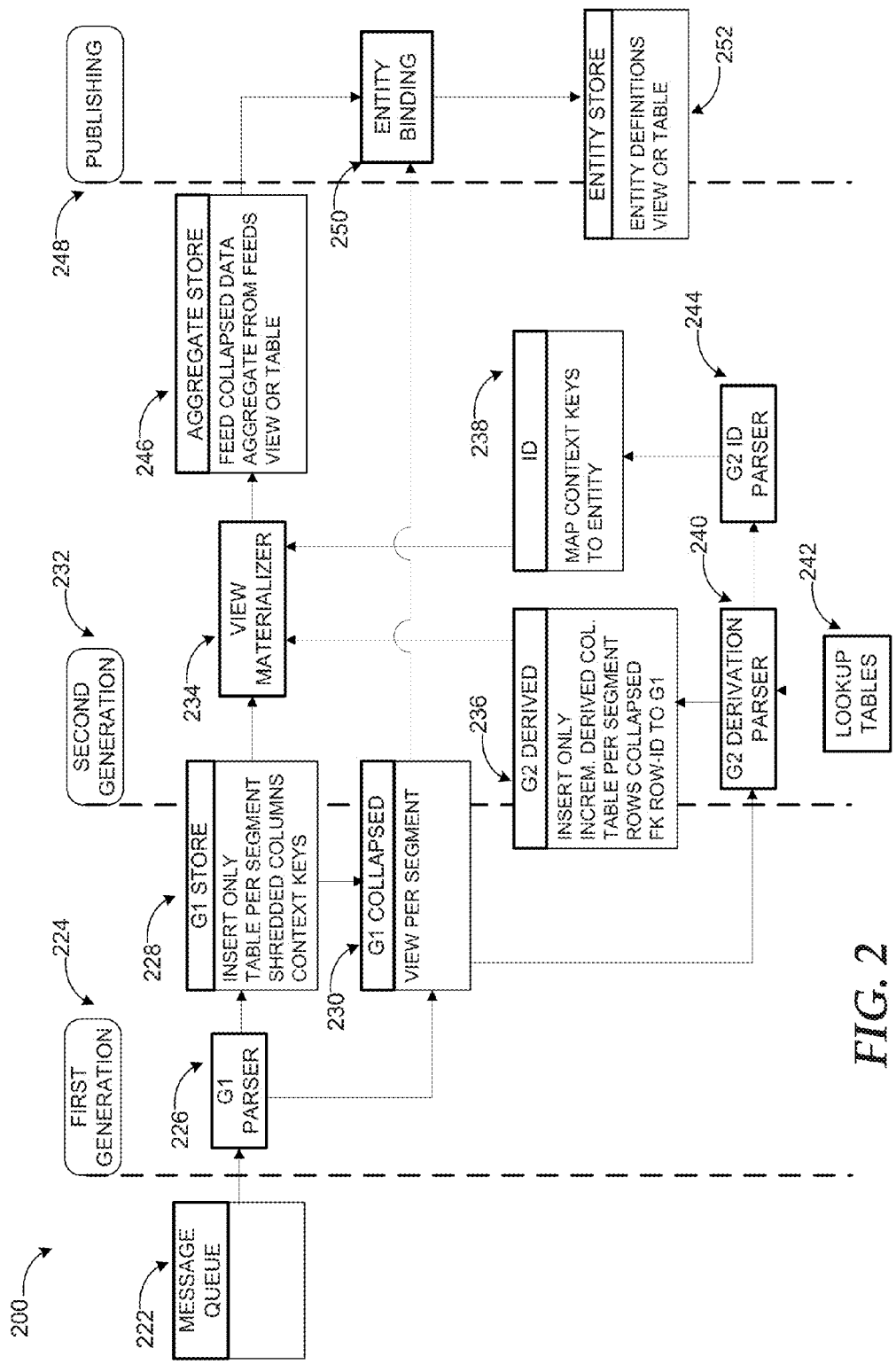
FIG. 2 illustrates an example high level parsing architecture for a system according to embodiments.

FIG. 2 illustrates an example high level parsing architecture 200 for a system according to embodiments. As discussed above, received messages may be retrieved from message queue 222 at a first generation phase 224 of the processing by first generation (G1) parser 226. G1 parser 226 may provide two outputs: one in G1 store 228, where shredded components are stored in insert-only form as tables per segment and shredded columns. Context keys may be used in the process. G1 parser 226 may also provide G1 collapsed data 230, which may include view for each segment.

The first generation phase 224 may be followed by second generation phase 232, where second generation (G2) derivation parser 240 may receive G1 collapsed data and using lookup tables 242 generate G2 derived data 236. G2 derived data 236 may also be in insert-only form and include incremental derived columns and a table for each segment, where each row is collapsed. G2 ID parser 244 may receive an output of G2 derived parser 240 and generate ID data 238, which may map context keys to entitles.

Also as part of the second generation phase 232, view materializer 234 may receive G2 derived data 236 and G2 ID data 238, and generate feed collapsed data aggregated from feeds as view or table, which may be stored in aggregate data store 246. In a publishing phase 248 of the message processing, entity binding may be performed using data from aggregate data store 246 and G1 collapsed data 230, and resulting entity definitions may be stored in entity store 252 as views or tables.

The functional aspects of the above described architecture may also be divided into sub-processes. For example, the structural reflection process may identify a highest level delimiter, with each item discovered representing a "segment". Each segment may then be reflected for the next level of delimiter, and each discovered item recognized as a "field." The process may be repeated until all levels of the structural semantics have been discovered.

The storage provision process may take the structural semantic description, and adapt that to be able to provision database storage. The storage mechanism may be a combination of tables (1:1 with segments), columns (1:1 with fields, 0-N with field sub-components depending on configuration), and/or XML columns to handle infinite depth and repetition within a field.

The auto-adaptation process may inspect each new message which is received, and verify any discrepancy against the existing database storage model. In the event that a new segment, field, or component is discovered, the database storage may be automatically modified to provide a storage container for the new structural component.

The collapse process may take a set of input parameters, and then apply an algorithm that uses these parameters to generate additional code, which may be tailored to the specific message set in question. The algorithm may be self-adjusting over time as message formats have a tendency to morph. Some of the example inputs for the HL7 scenario may include:

Collapses rows for each segment within an HL7 Feed
  Generate minimum of one view per table
    [Schema Name]. V_Collapse_[Segment Name]
    Parameters (Can be overridden per feed.segment)
      Context Key—Declare the column to use for collapsing
      Incremental Feed—Is this HL7 segment Incremental?
      Join Table—Join in a child table as part of the view (e.g. Add OBX to OBR headers)
      Result Type—Flag for latest, earliest, or all messages for a given context key
      Result Type Sort—Field to apply for sorting of Result Type
      Result Rows Filter—Field to remove rows from the source table Of course, similar algorithms may be designed for other messaging standards using the principles described herein.

Figure 3:
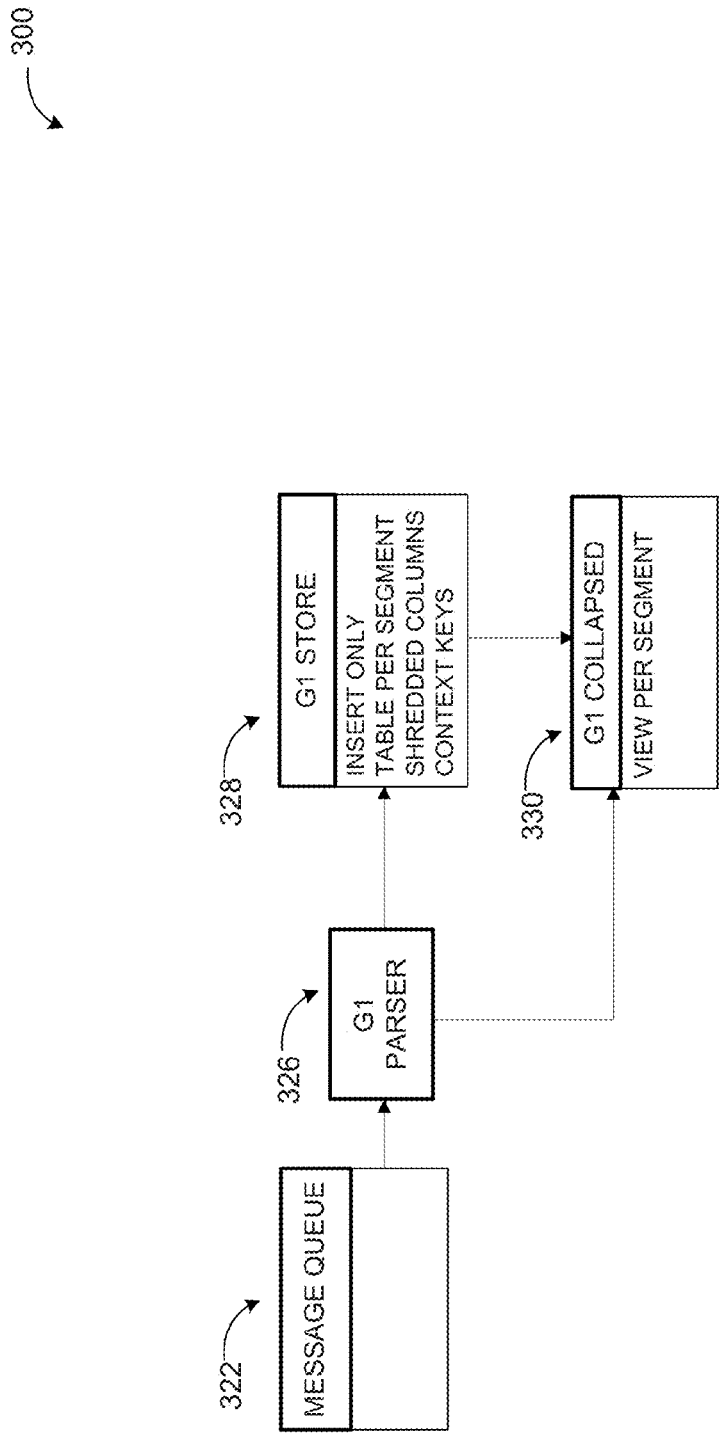
FIG. 3 illustrates an example first generation parser that may be used in processing messages.

FIG. 3 illustrates an example first generation parser that may be used in processing messages in diagram 300. As discussed above, the first generation (G1) parser 326 may take data from the message queue 322 and shred them into an insert-only store (G1 store 328).

Shredding may be performed automatically and messages can be parsed in with no configuration. Then, users may manage exceptions to the default behavior via configuration. The first generation tables may be insert-only. Messages may be shredded based on the structure and not the content. A table may be generated per segment, and a column for each raw valued string element. Each column can either be string valued or XML. XML columns may store certain kinds of data that need not be stored in their own columns such as HL7 repetitions. Of course, other configurations of storage may also be employed in conjunction with the first generation parsing.

The first generation parser 326 may retrieve N messages from the message queue 322 of the feed type that it is processing. Then, this batch may be shredded in parallel. The resulting data tables may be written to the G1 store 328 in a batch using table valued parameters. Event-driven triggering mechanisms may also be employed.

In some messaging standards, incremental or snapshot messages may be sent, in this case, each incremental or snapshot message belongs to a context key, which ties related messages together. For incremental or snapshot feeds, the context key may be defined as part of the workflow in the first generation parser 326. Sometimes, the context key may be in a repeating field. The context key may also be derived or normalized. The first generation parser 326 may facilitate for the correct context key to be selected into its own column. When such a context key is defined, an SQL view may be generated that returns the latest snapshot collapsed result of a first generation table (G1 collapsed data 330).

A context key uniquely identifies an entity. As an example, distinct lab requests (in healthcare messaging) are typically identified through their filler order number. In this case, a context key that is defined as the filler order number can be used to identify such lab request. Likewise, individual lab results are typically identified by the universal service id (of the order) and the set id of results in that order. In this case, the context key for those results may be defined as a concatenation of universal service id and set id. In first generation parsing, context keys may be a concatenation of values that exist strictly within a feed. Some of these values may be derived fields (e.g. in cases where the medical record number "MRN" has to be normalized). In some cases, the values that make up context keys need to be extracted from repetitions. The data may also be transformed, normalized, or cleansed (e.g. in cases where MRN has to be normalized). Therefore, in many cases, context keys may be defined in terms of derived columns. When a segment has ancestors, a context key may be defined with values from its ancestors. Additionally, each table may inherit all the context keys defined in their ancestors. A table may define multiple context keys where multiple entities need to be identified. Moreover, each context key may require multiple levels so that the entity can be described by alternate sets of data (e.g. MRN vs. social security number and first name).

According to some embodiments, a variety of file types and schemas such as HL7, XML, CSV, etc. may be supported. Extensibility points for preprocessing a message prior to shredding or for shredding may be included in the first generation parser.

Figure 4:
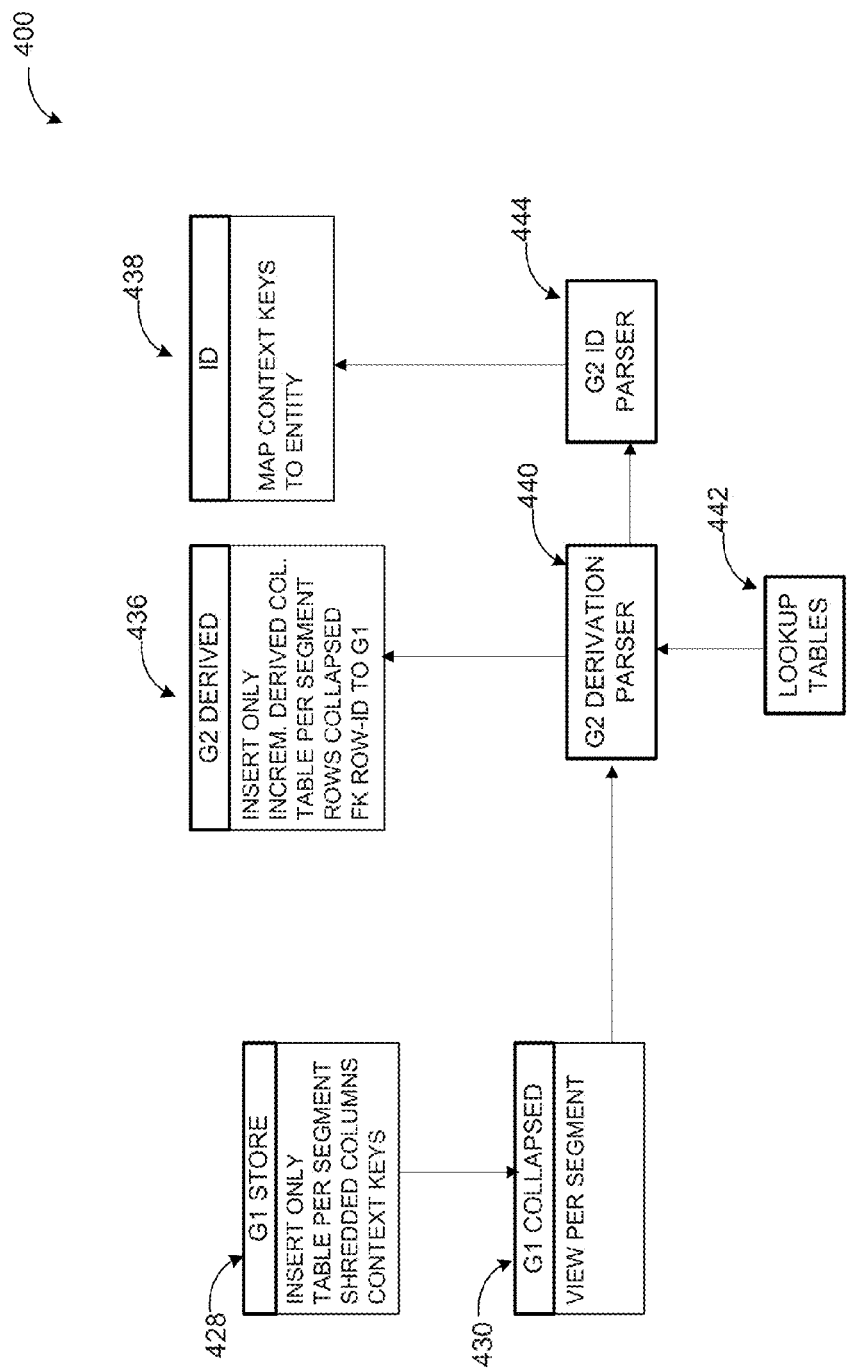
FIG. 4 illustrates an example second generation parser that may be used in processing messages.

FIG. 4 illustrates an example second regeneration parser that may be used in processing messages in diagram 400. The second generation parser may read data from the first generation store and perform data derivation and correlation. Derivation may be performed by G2 derivation parser 440 receiving G1 collapsed data 430 from G1 store 428 and data from lookup tables 442. G2 derivation parser 440 generates G2 derived data 436. Correlation may be performed by G2 ID parser 444 generating ID data 438, which maps context keys to entities.

The second generation parser is where cleansing, normalization, and/or typed transforms may be performed. Code look-ups, composite transforms (e.g., concatenations) may also be performed in this space. The second generation derived store may include a set of tables created for each segment table in the first generation store. There may be one row for every row in the first generation segment table. Below is an example first generation segment table followed by the corresponding second generation example table.

TABLE 1

Example first generation table

| RowId | MessageId | ContextKey | SequenceNo | PID.5.1 | PID.5.2 |
|---|---|---|---|---|---|
| $R_1$ | $M_1$ | $CK_1$ | 1 | YUJIN | Y1 |
| $R_2$ | $M_2$ | $CK_1$ | 2 | EUGENE | NULL |
| $R_3$ | $M_3$ | $CK_1$ | 3 | NULL | LEE |

TABLE 2

Example corresponding second generation table

| RowId | ContextKey | FirstName | LastName | FullName |
|---|---|---|---|---|
| $R_1$ | $CK_1$ | Yujin | Yi | Yujin Yi |
| $R_2$ | $CK_1$ | Eugene | Yi | Eugene Yi |
| $R_3$ | $CK_1$ | Eugene | Lee | Eugene Lee |

Each second generation table row may be the complete, incremental collapsed result that takes into account the messages with the same incremental context key up to the message containing that row. According to some embodiments, multiple instances of the second generation parser may be supported to run for a feed. In that case, all of the instances may write to the same derivation table.

In the single second generation parser instance scenario, since there is a one-to-one mapping between a first generation table and a second generation table, first generation table entries may be processed. However, certain derivations may require the entire context of a message in order to operate. Therefore, the triggering mechanism for second generation parsers may operate as follows:

Process N messages in a feed at a time that the first generation parser is done processing.

Use the collapsing view to read the segment rows where the collapsing result is up to the contents of the message). This ensures that each segment row is an incremental collapsed at its point in time.

Group all the segments that belong to the same message.

Identify any parent/child relationships between segments within the same message.

Furthermore, configuration may specify which elements within a first generation segment need to be read in for derivation. Configuration may also specify the derivation results and their types. Given this information, an object model for each input and output segment may be generated. For each message read, there may be an object generated representing the message. There may be a collection of input segment objects (multiples of each segment type) and a collection of output segments.

Figure 5:
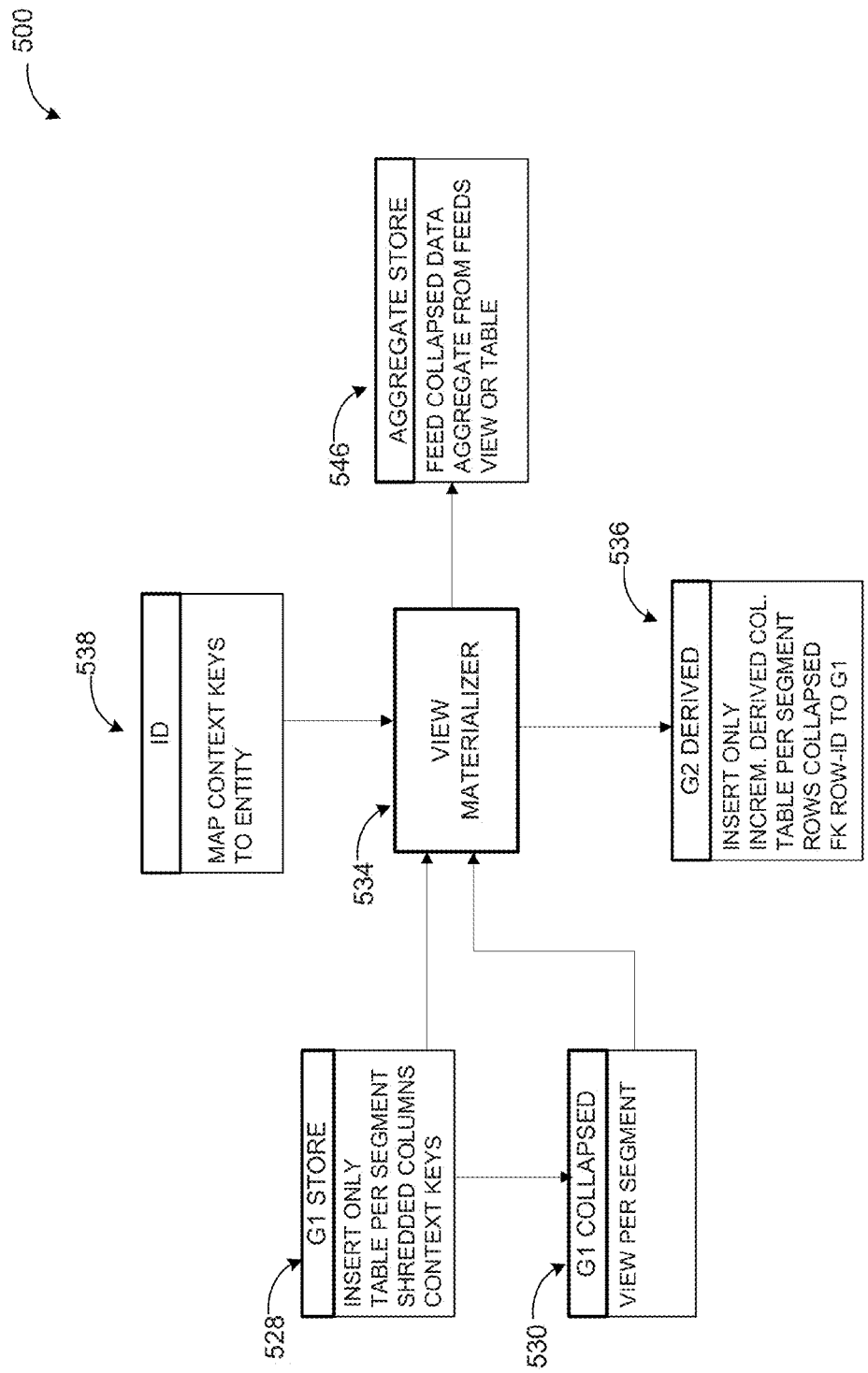
FIG. 5 illustrates an example view materializer that may be used in processing messages.

FIG. 5 illustrates an example view materializer that may be used in processing messages in diagram 500. The view materializer 534 may materialize views into a physical table such that accessing the table is faster and that eventing can work off of that table as well.

According to some embodiments, the first generation and second generation tables may be designed to be insert-only. These tables may also store data that belong to a single feed. But most entities are patient or visit centric and may require multiple rows in a feed table to be collapsed into one row. Furthermore, a lot of entities may also require data to be joined together from multiple feeds. An example of a query that defines such an entity is as follows:

LastLabPerPatient=>"Select OID, MAX(LabOrderDate) as LastLabDate From LAB.PID INNER JOIN AEID201 ON PID.MRN=AEID201.EIDExternal INNER JOIN LAROBR ON PID.MessageID=OBR.MessageID GROUP BY AEID201.OID HAVING OID IN (Select OID From AEID201 Where AEID.EIDExternal=[Message].PID.MRN)"

This is collectively referred to as aggregation. Performing aggregation strictly via SQL views may not be sufficient because the view itself may not perform very well or the data change tracking framework, which needs to event off entities and materialize the results may not be compatible with group-by and coalesce-over queries, required for most aggregation scenarios.

The view materializer 534 may materialize views and store them in aggregate store 546 using G1 collapsed data 530, data from 01 store 528, data from G2 derived store 536, and correlation data 538. The base tables in first and second generation parsers may be insert-only. Therefore, the insertion changes to RowId may need to be monitored, and only the distinct primary context keys in the change set may need to be queried for materialization. The process may be as follows:

On every polling interval, every base table is queried in a batch.

The query will select the distinct primary context keys within the next N rows for each base table.

Each primary context key value is deleted from the physical table.

The defining view is queried with each primary context key value and inserted into the physical table.

Figure 6:
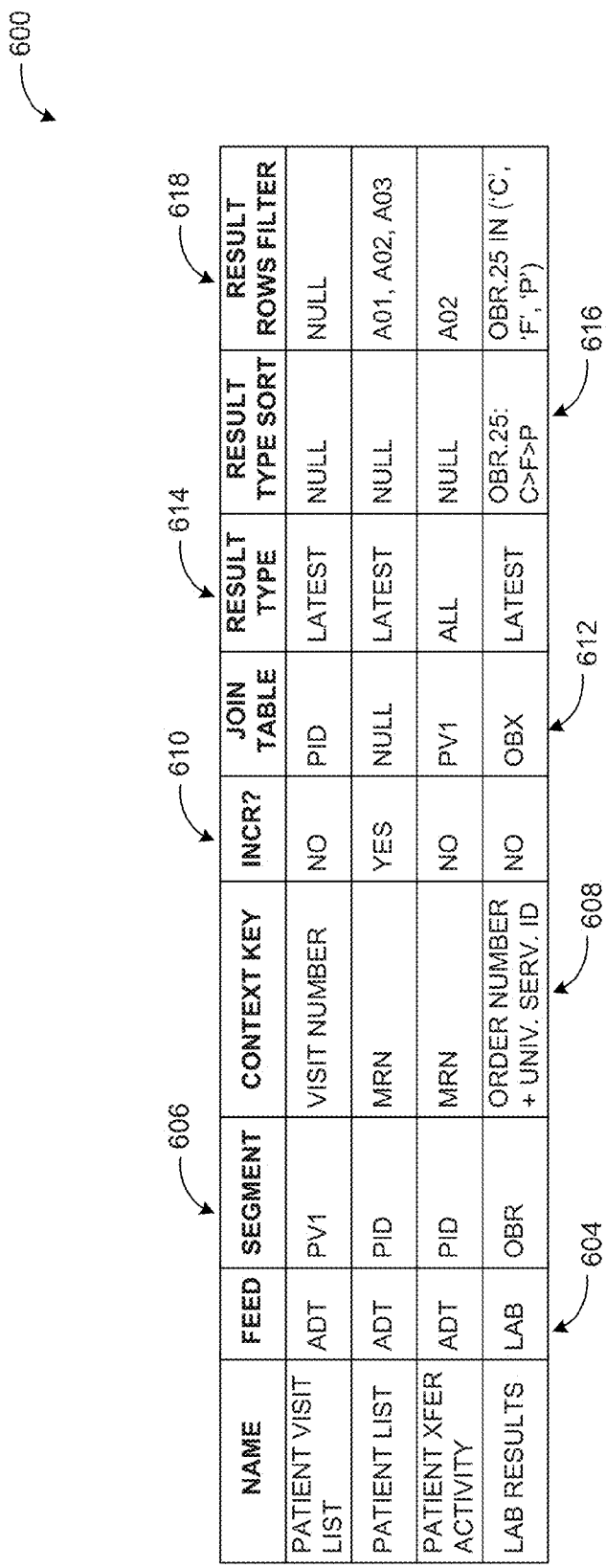
FIG. 6 illustrates example configurations that may be applied in the context of the healthcare messaging standard, HL7, which is one of the messaging standards that may be used in a system according to embodiments.

FIG. 6 illustrates example configurations that may be applied in the context of the healthcare messaging standard, HL7, which is one of the messaging standards that may be used in a system according to embodiments.

The example configurations in table 600 include "Patient Visit List", "Patient List", Patient Transfer Activity" and "Lab Results". Each one may be associated with a different feed 604, and segment 606. Context keys 608 declaring the column to use for collapsing may also be listed along with an indication of whether or not each segment is from an incremental feed (610) and the join table 612. Result types 614 may be a flag with a value of "latest", "earliest", or "all messages" for each context key. Result type sort 616 may indicate which field is to be applied for sorting the result types. Result rows filter 618 may indicate a field to remove rows from the source table for each configuration.

As mentioned above, data associated with the processes described herein may be stored in tables. For example, each segment within a message may typically correspond to a table. However, if a segment can have multiple parents, then a table for each parent-child relationship may be generated. The table structure may include basic columns, shredded columns, derived columns, and context key columns. The basic columns may include:

RowId: A ROWGUIDCOL column that uniquely identifies each row in a first generation table. Each new RowId( ) may be generated as NEWSEQUENTIALID( ).

MessageId: This column may allow tracking the lineage of first generation data back to msg201. Additionally, it may allow correlation data within a feed to the same message. Typically for cross feed correlation, data from multiple feeds may be joined together through MessageId.

SequenceNumber: This may be a sequencing identity column copied over from msg201. When all the messages are sorted by UTCDT, SequenceNumber may be expected to be monotonically increasing.

RelativeIndex: The relative index indicates what the position of the current segment is within the message. For instance, MSH may have a relative index of 0. The next segment may have a relative index of 1.

NextRelativeIndex: The NextRelativeIndex column stores values for the RelativeIndex of the next occurrence of the same segment. This column may be used in queries to find which of the child rows are related to each parent element.

The shredded columns are a mechanical representation of an incoming feed's data. For example, in HL7 messaging, each HL7 position (fields, components, sub components) may yield a column. If a message type happens to be repeating, the fields, components, and sub components in the first repetition may be generated as columns. In addition, an XML column repeat may be generated. All the repetitions, including the first repetition, may be stored in this XML column with a well-defined schema. The repeated columns may be of type XML.

Derived columns are columns that store derived data. Derived columns may be defined in configuration. An optional filter may be specified if the derived column is generated from a repeating field (XML column). The filter may be an xpath query which extracts a value from the input XML. A context key uniquely identifies an entity. For example, some requests are typically identified through their filler order number. In this case, a context key that is defined as the filler order number may be used to identify such a request. Likewise, individual results are typically identified by the universal service id (of the order) and the set id of results in that order. In this case, the context key for those results may be defined as a concatenation of universal service id and set id.

In the first generation parsing, context keys may be a concatenation of values that exist strictly within a feed. Some of these values may be derived fields (e.g. in cases where normalization is used). In some cases, the values that make up context keys may need to be extracted from repetitions. The first generation parser may also transform, normalize, or cleanse the data. Therefore, in some cases, context keys may be defined in terms of derived columns. When a segment has ancestors, a context key may be defined with values from its ancestors. Additionally, each table may inherit all the context keys defined in their ancestors.

A table may define multiple context keys where multiple entities need to be identified. In addition, each co ext key may require multiple levels so that the entity can be described by alternate sets of data. Finally, a context key may be created to perform incremental collapsing. This is referred to as the primary context key.

The different processes, configurations, and systems discussed in FIG. 1 through FIG. 6 may be implemented using distinct hardware modules, software modules, or combinations of hardware and software. Furthermore, such modules may perform two or more of the processes in an integrated manner. While some embodiments have been provided with specific examples for semantic reflection storage and automatic reconciliation of hierarchical messages, embodiments are not limited to those. Indeed, embodiments may be implemented in various systems using a variety of computing devices and applications and with additional or fewer features using the principles described herein. Moreover, embodiments may be implemented with any hierarchical messaging standard, such as HL7, EDI, X12, etc.

Figure 7:
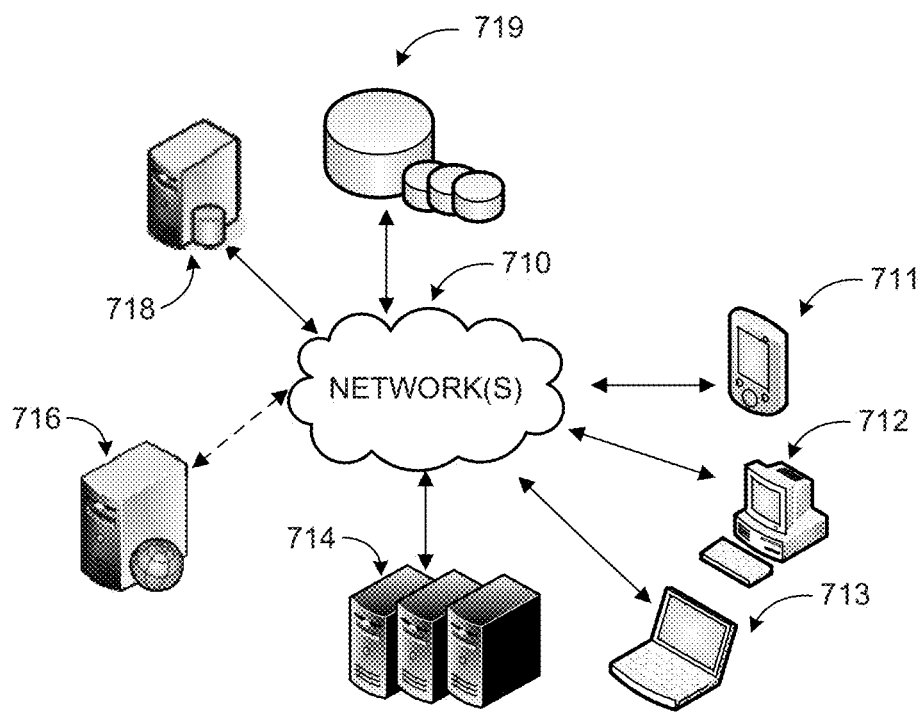
FIG. 7 is a networked environment, where a system according to embodiments may be implemented.

FIG. 7 is an example networked environment, where embodiments may be implemented. A platform for providing semantic reflection storage and automatic reconciliation of hierarchical messages may be implemented via software executed over one or more servers 714 such as a hosted service. The platform may communicate with client applications on individual devices such as a smart phone 711, desktop computer 712, laptop computer 713, or similar devices ('client devices') through network(s) 710.

Client applications executed on any of the client devices 711-713 may interact with a hosted service providing message processing services from the servers 714, or on individual server 716. The hosted service may provide multi-faceted services such as accounting, resource management, etc. As part of the provided services, hierarchically structured messages may be stored in one or more databases based on structural semantic reflection of the messages and the messages automatically reconciled. According to some embodiments, the structural semantics of an incoming message may be assessed and database storage provisioned based on the structural semantic reflection of the message as described above. Some or all of the processing associated with the message processing may be performed at one of more of the servers 714 or 716. Relevant data such as base tables, derived tables, context key tables, and similar data may be stored and/or retrieved at/from data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also include (especially between the servers and the mobile devices) cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a platform providing message processing services. Furthermore, the networked environments discussed in FIG. 7 are for illustration purposes only. Embodiments are not limited to the example applications, modules, or processes.

Figure 8:
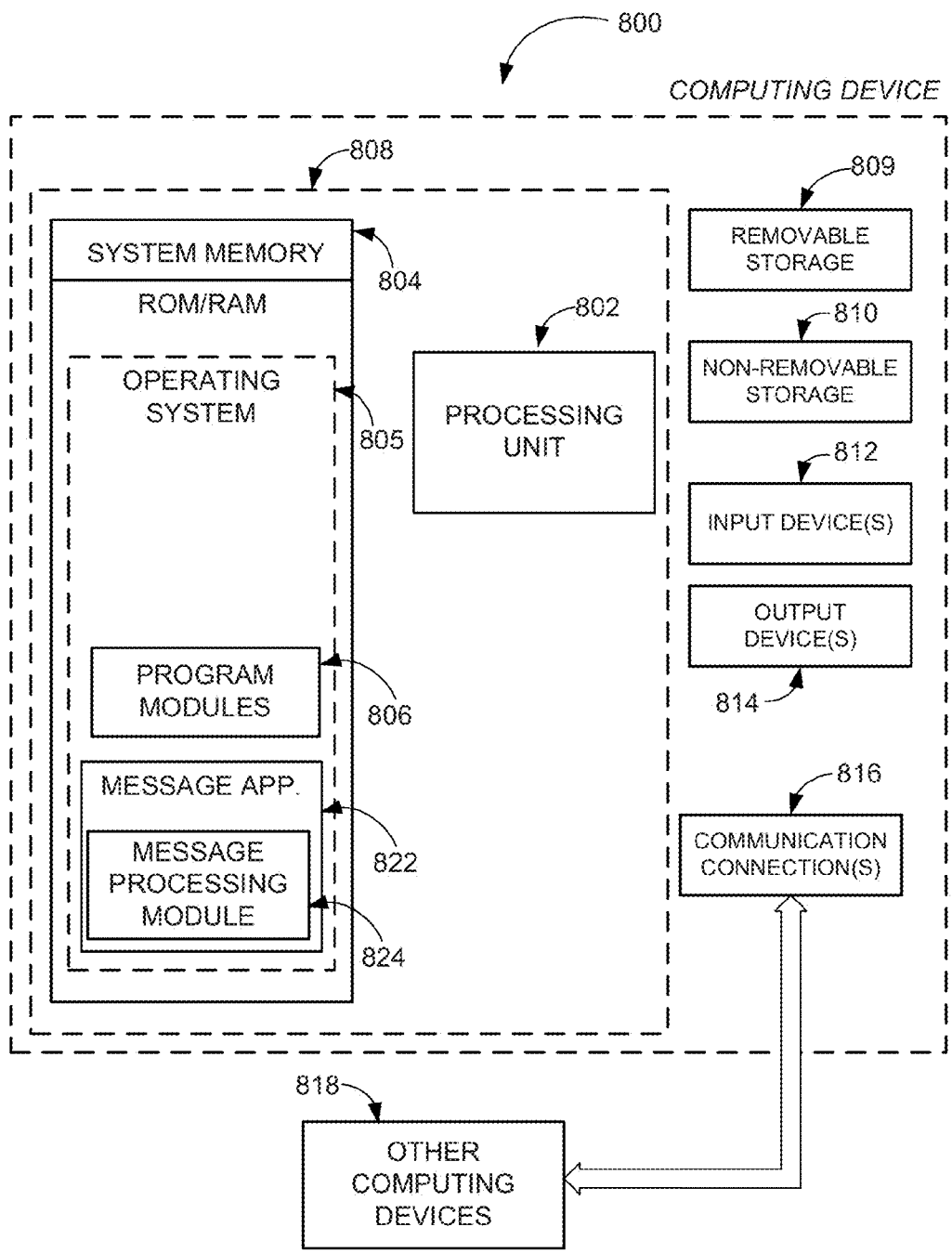
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a computing device capable of facilitating message processing according to embodiments and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS MOBILE®, WINDOWS PHONE®, or similar operating systems from MICROSOFT CORPORATION of Redmond, Wash. or similar ones. The system memory 804 may also include one or more software applications such as program modules 806, message application 822, and message processing module 824.

Message application 822 may enable exchange, storage, analysis, etc. of messages. Message processing module 824 may assess the structural semantics of an incoming message may be assessed and provision database storage based on the structural semantic reflection of the message. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wired or wireless network in a distributed computing environment, a satellite link, a cellular link, a short range network, and comparable mechanisms. Other devices 818 may include computer device(s) that execute communication applications, other servers, and comparable devices. Communication connection(s) 816 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
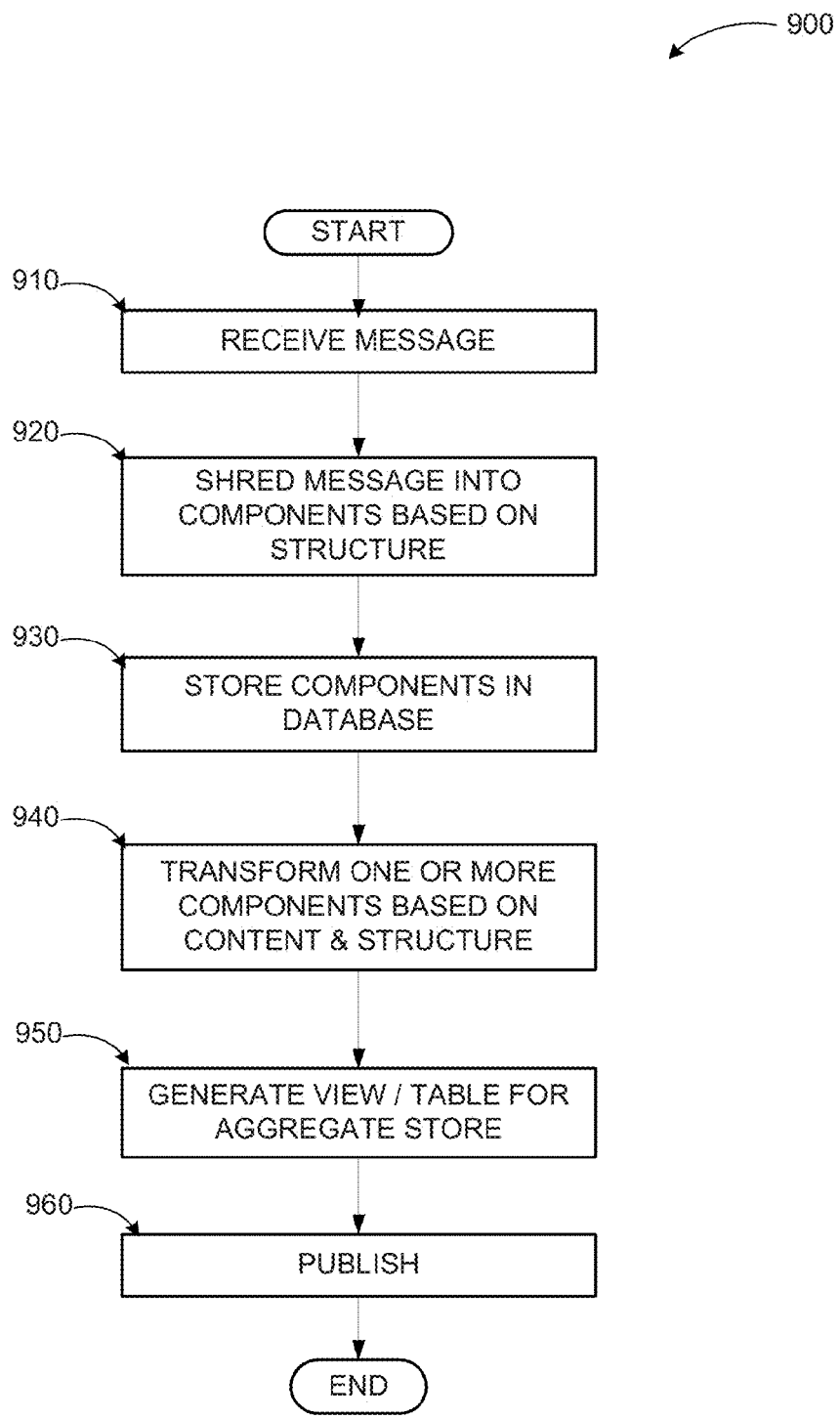
FIG. 9 is a flowchart for an example process of handling messages in a semantic reflection storage system according to embodiments.

FIG. 9 is a flowchart for example process 900 of handling messages in a semantic reflection storage system according to embodiments. Process 900 may be performed by a message application on a server or similar computing device.

Process 900 beings with operation 910, where a message is received. At operation 920, the message may be shredded into its components based on the structure defined by the messaging protocol such as HL7 or others. The shredded components of the message may be stored in a database (first generation store) at operation 930.

At operation 940, the message processing application may transform one or more components based on the content and structure. Items that are outside the structure defined by the messaging protocol or not currently in the database may be added as a new column. At operation 950, a view and/or table may be generated based on the transformed components and stored in an aggregate store. The view/table may be published at operation 960 to an entity store.

The operations discussed above in process 900 are examples for illustration purposes. Semantic reflection storage and automatic reconciliation of hierarchical messages may be performed using fewer or additional steps and in different orders using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device for semantic reflection storage and reconciliation of hierarchical messages, the method comprising:
   assessing structural semantics of an incoming message;
   shredding the incoming message into structural components by placing one of the structural components into a first generation data store;
   utilizing a second generation parser to:
      generate data from the structural components based on one or more of a content and a structure of the incoming message; and
      store the data in a second generation data store;
   presenting one or more options to a user for management of exceptions to a default behavior associated with the shredding of the incoming message through a configuration user interface;
   updating a state of a context associated with the incoming message in response to detecting a change in one or more of a code and a source of the incoming message;
   generating a correlation data mapping context key from the structural components; and
   mapping the correlation data mapping context key to an entity.

2. The method of claim 1, further comprising:
   generating a lookup table from the data of the second generation data store associated with the second generation parser.

3. The method of claim 2, wherein generating the lookup table comprises:
   inserting a column into the lookup table for a segment of the data;
   storing the segment into the column as one or more rows associated with the column; and
   collapsing the one or more rows to provide a view of the segment.

4. The method of claim 1, further comprising:
   performing a typed transformation as an additive auto-adaptation process; and
   inspecting the incoming message with the additive auto-adaptation process.

5. The method of claim 4, further comprising:
   generating a lookup table from the data of the second generation data store associated with the second generation parser;
   inserting a column into the lookup table for a segment of the incoming message; and
   storing the segment into the column as one or more rows associated with the column.

6. The method of claim 5, further comprising:
   in response to a determination of an existence of one or more discrepancies within the incoming message, verifying the one or more discrepancies with the additive auto-adaptation process against a database storage model of the second generation data store associated with the second generation parser.

7. The method of claim 1, further comprising:
   in response to a discovery of new structural components that include one or more of a new segment, a new field, and a new component associated with the incoming message, modifying a database storage model of Rail the second generation data store associated with the second generation parser to provide a storage container for the new structural components.

8. The method of claim 1, further comprising:
generating code to process the incoming message with a set of input parameters that include one or more of the correlation data mapping context key, a join table, a result type, a result type sort, and a result rows filter.

9. The method of claim 1, further comprising:
processing the incoming message with the data from an aggregate data store to perform a binding, of one or more entities in the incoming, message; and
storing definitions of the one or more entities in an entity store as one or more of views and lookup tables.

10. A computing device for managing semantic reflection storage and reconciliation of hierarchical messages, the comprising device comprising:
a memory, and
a processor coupled to the memory, the processor executing a message processing application in conjunction with instructions stored in the memory, wherein the message processing application includes:
a first generation parser configured to:
assess structural semantics of an incoming message,
shred the incoming message into structural components, and
one of store one of the structural components in a first generation data store in an insert-only form and collapse the structural components, during a first generation phase;
a second generation parser configured to:
generate data from the structural components based on one or more of a content and a structure of the incoming message,
store the data in a second generation data store in the insert-only form,
present one or more options to a user for management of exceptions to a default behavior associated with the shredding of the incoming message through a configuration user interface,
generate a correlation data mapping context key from the structural components, and
map the correlation data mapping context key to an entity, during a second generation phase; and
a view materializer configured to:
during the second generation phase, aggregate structural component data in a first generation data store, the data in the second generation data store, and data from a correlation data store to generate one of a view and a table for each segment of the incoming message; and
during a publishing phase, perform entity binding using the aggregated data and store resulting entity definitions in an entity store as one of the view and the table.

11. The computing device of claim 10, wherein the second generation parser is further configured to:
map the correlation data mapping context key to another entity associated with the aggregated data; and
store the correlation data mapping context key and the other entity in the entity store.

12. The computing device of claim 10, wherein the second generation parser is further configured to:
process feeds associated with the incoming message to determine a context associated with the incoming message; and
determine segments of the incoming message based on the context.

13. The computing device of claim 12, wherein the second generation parser is further configured to:

identify a parent and a child relationship between the segments.

14. The computing device of claim 10, wherein the second generation parser is further configured to:
perform derivation operations on the aggregated data.

15. The computing device of claim 14, wherein the second generation parser is further configured to:
store results of the derivation operations in the second generation data store associated with the second generation parser.

16. A computer-readable memory device with instructions stored thereon for managing semantic reflection storage and reconciliation of hierarchical messages, the instructions comprising:
assessing structural semantics of an incoming message through use of a first generation parser;
shredding the incoming message into structural components by placing one of the structural components into a first generation data store;
utilizing a second generation parser to:
perform at least one from a set of: cleansing, normalization, and a typed transformation on the structural components based on at least one of a content and a structure of the incoming message;
generate data from the structural components based on one or more of the content and the structure of the incoming message; and
store the data in a second generation data store;
presenting one or more options to a user for management of exceptions to a default behavior associated with the shredding of the incoming message through a configuration use interface;
updating a state of a context associated with the incoming message in response to detecting a change in one or more of a code and a source of the incoming message;
generating correlation data mapping context key from the structural components; and
mapping the correlation data mapping context key to an entity.

17. The computer-readable memory device of claim 16, wherein the instructions further comprise:
in response to a discovery of new structural components that include one or more of a new segment, a new field, and a new component associated with the incoming message, modifying a database storage model of the second generation data store associated with the second generation parser to provide a storage container for the new structural components.

18. The computer-readable memory device of claim 16, wherein the instructions further comprise:
generating code of an algorithm to process the incoming message with a set of input parameters that include one or more of the correlation data mapping context key, a join table, a result type, a result type sort, and a result rows filter; and
allowing the algorithm to self-adjust in response to a morphing of a format of the incoming message.

19. computer-readable memory device of claim 18, wherein the instructions further comprise:
performing the typed transformation as an additive auto-adaptation process;
inspecting the incoming message with the additive auto-adaptation process;
generating, a lookup table from the data of the second generation data store associated with the second generation parser;

inserting a column into the lookup table for a segment of the incoming message; and storing the segment into the column as one more rows associated with the column.

20. The computer-readable memory device of claim 19, wherein the instructions further comprise:

in response to a determination of an existence of one or more discrepancies within the incoming message, verifying the one or more discrepancies with the additive auto-adaptation process against a database storage model of the second generation data store associated with the second generation parser.

* * * * *